United States Patent Office 3,420,555
Patented Jan. 7, 1969

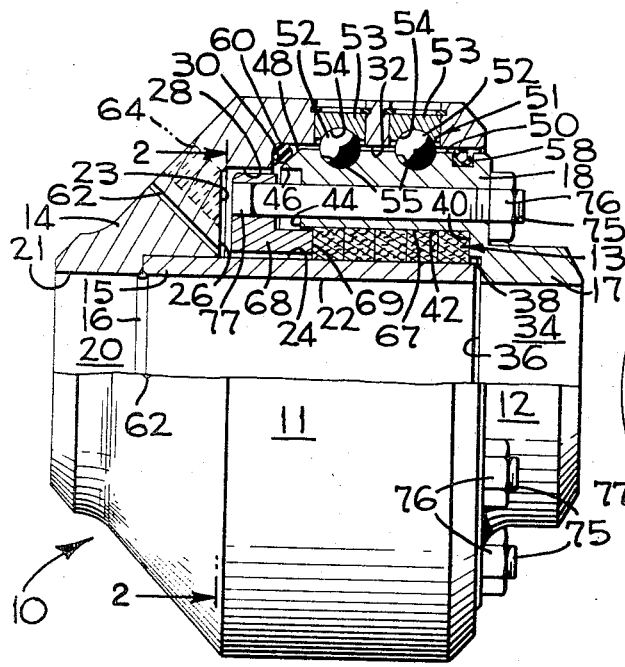
Jan. 7, 1969 A. L. FACCOU 3,420,555
SWIVEL JOINT WITH ADJUSTABLE PACKING
Filed Sept. 7, 1966
INVENTOR.
ARMAND L. FACCOU
BY
Francis W. Anderson
ATTORNEY

3,420,555
SWIVEL JOINT WITH ADJUSTABLE PACKING
Armand L. Faccou, Santa Ana, Calif., assignor to
FMC Corporation, San Jose, Calif., a corporation
of Delaware
Filed Sept. 7, 1966, Ser. No. 577,656
U.S. Cl. 285—276             3 Claims
Int. Cl. F16l 27/06

ABSTRACT OF THE DISCLOSURE

A pipe swivel joint especially adapted for handling corrosive and high temperature fluids, with a packing that can be adjusted for maintaining a fluid-tight seal while the joint is fully assembled and in service, and with bearings arranged to minimize any adverse loading that might be exerted on the packing.

---

This invention relates to a fluid conduit swivel joint with an adjustable packing. More particularly, this invention concerns a swivel joint with a packing that can be adjusted to regulate the pressure it exerts against the surfaces that confine it, thus to maintain a fluid-tight seal and control the swivel joint's resistance two swiveling, without disassembling the joint.

Swivel joints in conduits used for transporting corrosive fluids and those at elevated temperatures, such as sulfuric acid, hydrogen sulfide, steam, etc., are subjected to conditions so severe that frequently leakage occurs at the packing in a relatively short time. The packing in these joints also undergoes abrasive wear as the joint swivels, wear which is accelerated by heat and chemical reaction. Leaks in systems under these conditions demand prompt repair, but taking the joint apart to replace the leaky packing though always a costly procedure, is not always possible. The prior art swivel joints with packing adjustment features have failed to fulfill this need for one reason or another, especially where the adjustment feature is linked to the main structure of the swivel joint as to make leak stoppage a major task.

Another problem occasionally encountered with swivel joints is that of controlling their freedom to rotate. Normally, the easier the swivel joint rotates the better, but in some situations a greater than normal resistance to rotation is desired, i.e., greater than the resistance of the bearings and the packing pressure sufficient to effect a leak-free seal. However, the known procedures for doing this, such as presetting the resistance before the joint is installed in the line and breaking the joint-to-line connection of a previously installed device, are so involved and impractical as to materially reduce the value of the joint.

The foregoing problems are solved by the present invention which, in summary, involves a pipe swivel joint with an annular packing disposed between the joint's inner and outer concentric, relatively rotatable units and radially inwardly of the swivel bearing, and an annular pressure plate connected to the inner unit by a plurality of circumferentially spaced adjustable tensioning rods. The pressure plate plate bears against the packing and forces it into fluid-tight engagement with the inner and outer rotatable units when the tensioning rods are adjusted, as by tightening threaded nuts. The packing can be adjusted, while the swivel joint is fully assembled, and in fact while it is installed and in service in a conduit, so that a fluid seal can be maintained without the necessity of dismantling the joint or even removing it from the conduit.

Accordingly, an object of the present invention is to provide a swivel joint with an adjustable packing that has unusually high resistance to leaking even under severe operating conditions.

Another object of the present invention is to provide a swivel joint that will conduct fluids at high temperatures for greatly prolonged time periods without leaking.

Another object of the present invention is to provide a swivel joint that will conduct corrosive and otherwise chemically-active fluids leak-free for unusually extensive time periods.

Another object of the present invention is to provide a swivel joint with a packing that can be adjusted to maintain a leak-free seal.

Another object of the present invention is to provide a swivel joint with an adjustable packing for simply and quickly varying the rotational resistance of the joint.

Another object of the present invention is to provide a swivel joint with a packing that can be adjusted without disassembling the joint.

Still another object of the present invention is to provide a swivel joint with an adjustable packing that isolates the adjusting elements from the fluid conducted by the joint.

A further object of the present invention is to provide a swivel joint with an adjustable packing that, when slightly pressured, greatly increases its sealing action.

Yet another object of the present invention is to provide a swivel joint with bearings and packing arranged to minimize any adverse loading exerted upon the packing from worn and loose bearings.

The foregoing and other objects of the invention will become readily apparent from the following description thereof, including the accompanying drawings in which:

FIGURE 1 is a view in side elevation, partially in section, of a swivel joint within the scope of this invention showing the packing, the elements for adjusting it, and the relationship of the several parts to each other;

FIGURE 2 is a view in transverse section taken along the line 2—2 of FIGURE 1, showing the spacing and seating arrangement of the packing adjusting bolts;

FIGURE 3 is a view in section taken along the line 3—3 of FIGURE 2, illustrating the configuration of the packing pressure plate;

FIGURE 4 is a partial view in longitudinal section of a modification of the swivel joint of FIGURE 1, showing another version of the packing;

FIGURE 5 is another partial view in longitudinal section of the swivel joint of FIGURE 4, showing the effect of compression on the packing;

FIGURE 6 is a view in longitudinal section of a portion of another version of the swivel joint of FIGURE 1 modified for high temperature service, with retainers for the bearing balls; and FIGURE 7 is a view in side elevation of a portion of the bearing balls and their retainers of FIGURE 6.

As illustrated in the drawings, the swivel joint 10 of this invention generally comprises an outer conduit 11, an inner conduit 12 swivelly connected to the outer conduit, and a packing 13 that forms a fluid-tight seal between these two conduits. In its preferred form, the outer conduit 11 includes a main body 14 and a sleeve 15 which can be pressed or shrunk into the main body 14 and the two then preferably welded, as at 16. Alternatively, the main body 14 and the sleeve 15 can be formed as a single, integral part. Where they are formed as two separate parts, the main body 14 and the sleeve 15 can be constructed from the same or different materials; for example, the sleeve can be made from stainless steel and the body from carbon steel. The inner conduit 12 comprises an outer body portion 17 integral with an inner body portion 18.

The outer conduit 11 has an axial bore 20, formed by the inner cylindrical wall 21 of the main body 14 and the inner cylindrical wall 22 of the sleeve 15, and an annular chamber 23 between the main body 14 and the sleeve 15. This annular chamber 23 is defined by an inner cylindrical wall 24 which is the outer wall of the sleeve 15, a first radial wall 26 extending outward from the inner cylindrical wall 24, a first outer cylindrical wall 28 projecting axially from the radial wall 26, a second radial wall 30 extending outward from the first outer cylindrical wall 28, and a second outer cylindrical wall 32 projecting axially from the second radial wall 30.

As illustrated in FIGURE 1, the inner conduit 12 has an axial bore 34 that is coaxial with the bore 20 of the outer conduit 12. The inner body portion 18 of the inner conduit 12 has a first radial wall 36, a first cylindrical wall 38 projecting axially from the radial wall 36, a second radial wall 40 projecting outward from the first inner cylindrical wall 38, a second inner cylindrical wall 42 projecting axially from the second radial wall 40, a third radial wall 44 extending outward from the second inner cylindrical wall 42, a third inner cylindrical wall 46 projecting axially from the third radial wall 44, an inner end wall 48 extending outward from the third inner cylindrical wall 46, and an outer cylindrical wall 50 extending axially from the end wall 48.

The conduits 11, 12 are interconnected for relative swivel movement by bearings 51 with balls 52 which are retained by plugs 53 in races 54 and 55 of the conduits 11, 12 respectively, all as is well known. Outer seal 58 isolates the bearings 51 from the external atmosphere and protects them from dust, moisture and other contaminants, and inner seal 60 prevents escape of the bearings from within the joint. A series of spaced vent holes 62 allows fluid leakage to escape to the atmosphere. In systems handling corrosive or otherwise harmful fluids, such as sulfuric acid, one or more access ports 64 (illustrated by phantom lines in FIGURE 1) with sealing covers (not shown) can be substituted for vents 62 to provide a means for flushing the joint after leakage past the packing 13 has been stopped.

The cylindrical wall 24 of the outer conduit 11, the second radial wall 40 of the inner conduit 12, and the second inner cylindrical wall 42 of the inner conduit 12 together define an annular packing chamber 67 into which extends an annular packing pressure plate 68. The front radial wall 69 of the pressure plate 68 is drawn and held against the packing 13 by packing bolts 75 which extend through the conduit 12 to external nuts 76. An annular groove 70, with walls 71 and 72, is provided in the packing pressure plate 68 to accommodate the heads 77 of the packing bolts 75. As illustrated in FIGURE 2, the heads 77 are flattened on opposite sides so that when they are in position in the annular groove 70 they are restricted from turning by the walls 71, 72. As the nuts 76 are tightened on the bolts 75, the pressure plate 68 pressures the packaging 13 against the radial wall 40 and the cylindrical walls 24, 42, establishing fluid-tight seal between the conduits 11, 12.

As is readily apparent, the pressure plate 68, and thus the packing 13, can be adjusted by rotation of the nuts 76 on the bolts 75 to the extent of the maximum travel of the pressure plate 68 into the packing chamber 67. By observing the extension of the bolts 75 through their nuts 76 at the time the packing is installed, the increase in this extension as the nuts are tightened serves as a gauge for determining the position of the pressure plate 68, and hence the condition of the packing. This gauge also provides a method for determining the alignment of the pressure plate 68 with respect to the bore of the swivel joint, i.e., unless the bolts all extend beyond their nuts equally, the pressure plate is misaligned and therefore not pressurizing the packing evenly. Keeping the pressure plate aligned with the bore has been found to produce the longest life and best seal from the packing.

Depending on the service in which the swivel joint of this invention is to be used, many compositions are suitable for packing materials, including asbestos, various elastomers, plastics and metals. Packings made from virgin Teflon (registered trademark of E. I. du Pont de Nemours & Company for their fluorcarbon resins), asbestos impregnated with Teflon, and combinations of Teflon with rubber and metallic foil all will perform very satisfactorily in this joint. Teflon, alone or in combination with other chemically inert materials, have been found highly durable, especially in sealing off corrosive chemicals.

Packings of rectangular cross section, such as is illustrated in FIGURE 1, generally are preferred, but those with other cross-sectional configuration, such as chevrons, also are operable so long as they provide the desired sealing action. A particularly satisfactory packing 80, shown in FIGURES 4 and 5, comprises rings of generally square, deformable packing material 81 separated by rigid rings 82 of triangular cross-sectional configuration. In this combination the flat radial side 83 of the ring 82 is positioned facing away from the pressure plate 68, so that when the packing 80 is compressed the radial edge 84 of the ring 82 is forced into the adjacent packing material (FIGURE 5), tending to flare it and seal its axial surfaces 85 more tightly against the walls 24, 42. The packing 81 also can have a cross-sectional configuration other than rectangular as long as it cooperates satisfactorily with the rings 82.

The position of the packing 13 with respect to the bearings 51 is particularly noteworthy. Since the packing is directly beneath the bearings, i.e., is on a perpendicular drawn from the common axis of the bores of the conduits 11, 12 to the bearings 51, any adverse loading on the packing due to angular forces tending to deflect the axis of one conduit out of alignment with the other is minimized. For example, after prolonged use the bearings may be worn and loose sufficiently to permit some bore misalignment. However, because of this position relationship between the packing and the bearings, very little if any increase in packing loading occurs even from severe bore misalignment, and the packing therefore enjoys unusually long service life.

Another feature of the swivel joint 10 helping to account for the improved operational longevity is the fact that none of the stress due to packing adjustment is transmitted to the bearings. Instead, this stress is applied to the interface between the packing and the walls 24, 40, and 42 of the packing chamber to increase the tightness of the seal. Since the load on the bearings is not affected, they suffer no increase in wear rate regardless of the frequency or extent of packing adjustment.

In situations where the temperature of the fluid coursing through the swivel joint is too high to permit use of conventional lubricants, the joint can be modified as illustrated in FIGURES 6 and 7. This involves placing a pair of annular retainers 90 between the bearing races 54, 55 and using either a dry-film lubricant or no lubricant at all. The retainers 90 have regularly spaced apertures 91 to accommodate the bearing balls 52, and bridging 92 between the apertures 91 to keep the balls apart and thus prevent rubbing and wear. The elastomeric dust seals 58, 60 also can be replaced by high temperature seals 95 and 96 made of compositions such as asbestos that will withstand the prevailing conditions. Such high temperatures seals can be of any cross-sectional configuration that will satisfy the sealing demand, including rectangular (FIGURE 6) and round like seals 58, 60.

The swivel joint 10 can be assembled quite easily in the following manner. The packing material is inserted into position within the cylindrical wall 42 of the conduit 12, and the pressure plate 68 then fitted against the packing 13 and bolted in place with bolts 75 and their nuts 76. With the outer dust seal 58 in place on the conduit 12 and the inner dust seal 60 in its sealing position in the outer conduit 11, the conduits 11, 12 are interfitted, the balls 52 installed in their races 54, 55 to hold the conduits 11, 12 together, and the plugs 53 inserted to seal in the balls. This procedure can be reversed to disassemble the joint. Lubricant is applied to the bearings before assembly, and when the retainers 90 are used they are slipped over the inner body 18 of the inner conduit 12 encircling the races 55 prior to interfitting the conduits 11, 12.

From the foregoing it will be apparent that the subject swivel joint possesses several advantages, including packing that is substantially unaffected by external loading on the joint tending to misalign the axes of its conduits, that is readily adjustable to provide and maintain a fluid-tight seal even under extreme operating conditions, that minimizes swivel joint bearing stress and wear due to packing stress, and that provides a method for controlling the rotational freedom of the joint.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A swivel joint for use in conducting corrosive fluids and fluids at elevated temperatures, comprising
    an outer annular conduit having an outer wall, an inner wall defining an axial bore, and a chamber extending axially from one end of said outer conduit between said outer and inner walls, said annular chamber having an inner cylindrical surface and an outer cylindrical surface;
    an inner annular conduit swivelly connected to said outer conduit and having a fluid-conducting body and a packing-chamber body, said fluid-conducting body having a wall defining an axial bore, said packing-chamber body having an inner cylindrical surface, an outer cylindrical surface, and a generally radial inner end surface, said packing-chamber body fitting into said annular chamber;
    annular packing means between said inner cylindrical surface of said annular chamber and said inner cylindrical surface of said packing-chamber;
    bearing means disposed radially outwardly from said annular packing means to swivelly connect said inner and outer conduits; and
    pressure means associated with said inner conduit to adjustably pressurize said packing means and maintain a fluid-tight seal between said packing means and said inner cylindrical surfaces;
    said pressure means including an annular pressure plate in the axially inner portion of said packing chamber and a plurality of adjustable tensioning means, said pressure plate being axially movable in said packing chamber by said tensioning means, said pressure plate having a first radial surface and a second radial surface, said first radial surface bearing against said packing means and said second radial surface providing a foundation for said adjustable tensioning means, said adjustable tensioning means connecting said pressure plate to said inner conduit in such a way that the pressure exerted on said packing means can be adjusted while the swivel joint is assembled and in service.

2. A swivel joint according to claim 1 wherein said packing means comprises a plurality of rings of deformable packing material separated by at least one rigid of generally triangular cross-sectional configuration, said deformable packing material selected from the group consisting of elastomers, asbestos, metal, fluoro-carbon resins, and mixtures thereof.

3. A swivel joint according to claim 1 wherein said outer and inner annular conduits are swivelly connected by a double-row ball bearing system circumscribing said annular packing means and on a perpendicular from the axis of said bore through said annular packing means.

References Cited

UNITED STATES PATENTS

| | | | |
|---|---|---|---|
| 795,444 | 7/1905 | Kales | 285—338 X |
| 1,703,823 | 2/1929 | Johansen | 285—275 X |
| 1,737,465 | 11/1929 | Lindsey | 285—281 X |
| 2,158,829 | 5/1939 | Miller | 285—338 |
| 2,396,123 | 3/1946 | Phillips | 285—276 X |
| 2,509,118 | 5/1950 | Warren | 285—276 |
| 2,927,804 | 3/1960 | Snyder et al. | 285—276 X |

CARL W. TOMLIN, *Primary Examiner.*

THOMAS F. CALLAGHAN, *Assistant Examiner.*

U.S. Cl. X.R.

285—14

UNITED STATES PATENT OFFICE
CERTIFICATE OF CORRECTION

Patent No. 3,420,555 January 7, 1969

Armand L. Faccou

It is certified that error appears in the above identified patent and that said Letters Patent are hereby corrected as shown below:

Column 1, line 63, cancel "plate", first occurrence.
Column 6, line 21, after "rigid" insert -- ring --.

Signed and sealed this 14th day of April 1970.

(SEAL)
Attest:

Edward M. Fletcher, Jr.

Attesting Officer

WILLIAM E. SCHUYLER, JR.

Commissioner of Patents